United States Patent [19]

Pioth

[11] 4,300,782

[45] Nov. 17, 1981

[54] STRETCHER

[76] Inventor: Michael J. Pioth, 5900 Center St., Valley City, Ohio 44280

[21] Appl. No.: 93,921

[22] Filed: Nov. 13, 1979

[51] Int. Cl.[3] .......................... B62B 3/02; A61G 1/02

[52] U.S. Cl. ....................................... 280/47.11; 5/63; 5/81 R; 280/775; 296/20

[58] Field of Search ...................... 280/47.11, 775, 659; 180/19 S; 296/20; 5/62, 63, 81 R

[56] References Cited

U.S. PATENT DOCUMENTS

| | | | |
|---|---|---|---|
| 1,011,935 | 12/1911 | Fields | 280/47.11 |
| 2,859,975 | 11/1958 | Weaver et al. | 280/47.11 |
| 3,126,208 | 3/1964 | De Voghel | 280/47.11 |
| 3,820,838 | 6/1974 | Limpach | 296/20 |

FOREIGN PATENT DOCUMENTS

| | | | |
|---|---|---|---|
| 2285113 | 4/1976 | France | 296/20 |
| 364269 | 1/1932 | United Kingdom | 280/47.11 |

*Primary Examiner*—David M. Mitchell

*Attorney, Agent, or Firm*—T. A. TeGrotenhuis

[57] ABSTRACT

A stretcher for moving hospital patients from place to place to place has a bed portion carried by a chassis preferably with suitable conventional means for raising and lowering head and foot portions of said bed portion with respect to said chassis, said chassis having a wheel at each of the four corners thereof is improved so as to be easily operable by one man instead of the usual two, by providing means, operable from the head end of the stretcher, for causing the swivel frame of one wheel at the foot end of the stretcher to turn and maintain the plane of the wheel in any desired direction, said means is preferably operable through a telescoping guide member.

6 Claims, 8 Drawing Figures

STRETCHER

This invention relates to a stretcher or gurney for transporting sick or invalid patients in hospitals and nursing homes. It particularly relates to a stretcher which can be readily and effectively operated by one person instead of two as usually required with other stretchers. It comprises means, operable from one end to engage the swivel frame of a caster wheel at the other end and change the plane of rotation of the caster wheel journaled therein.

In order to facilitate movement of the stretcher during the transfer of patients from stretcher to bed, X-ray table and the like it is necessary to have the stretcher equipped with freely swivelable caster wheels of substantial size. Those freely swivelable wheels, however, make it very difficult for one operator to make turns with a loaded stretcher. Two operators are, therefore, usually required. It is also highly desirable to have the bed portion of the stretcher adjustable in height.

It is an object of the invention to provide a stretcher with freely swivelable wheels yet which is provided with means for steering it along a desired path by one operator.

It is a further object to provide a stretcher so equipped that one operator pushing or pulling the stretcher from one end may intermittently steer the far end as he desires even though the caster wheels are freely swivelable at times.

A further object of the invention is to provide a stretcher equipped with brakes, means for changing the height of the bed portion with respect to the wheels, and means operable from one end of the stretcher for directing the angle of swivel of the caster wheels at the opposite end.

These and other objects of the invention will be apparent from the following description of the invention as illustrated from the accompanying drawings in which like parts are illustrated by like numerals of reference through out the several views and in which.

Figure 1:
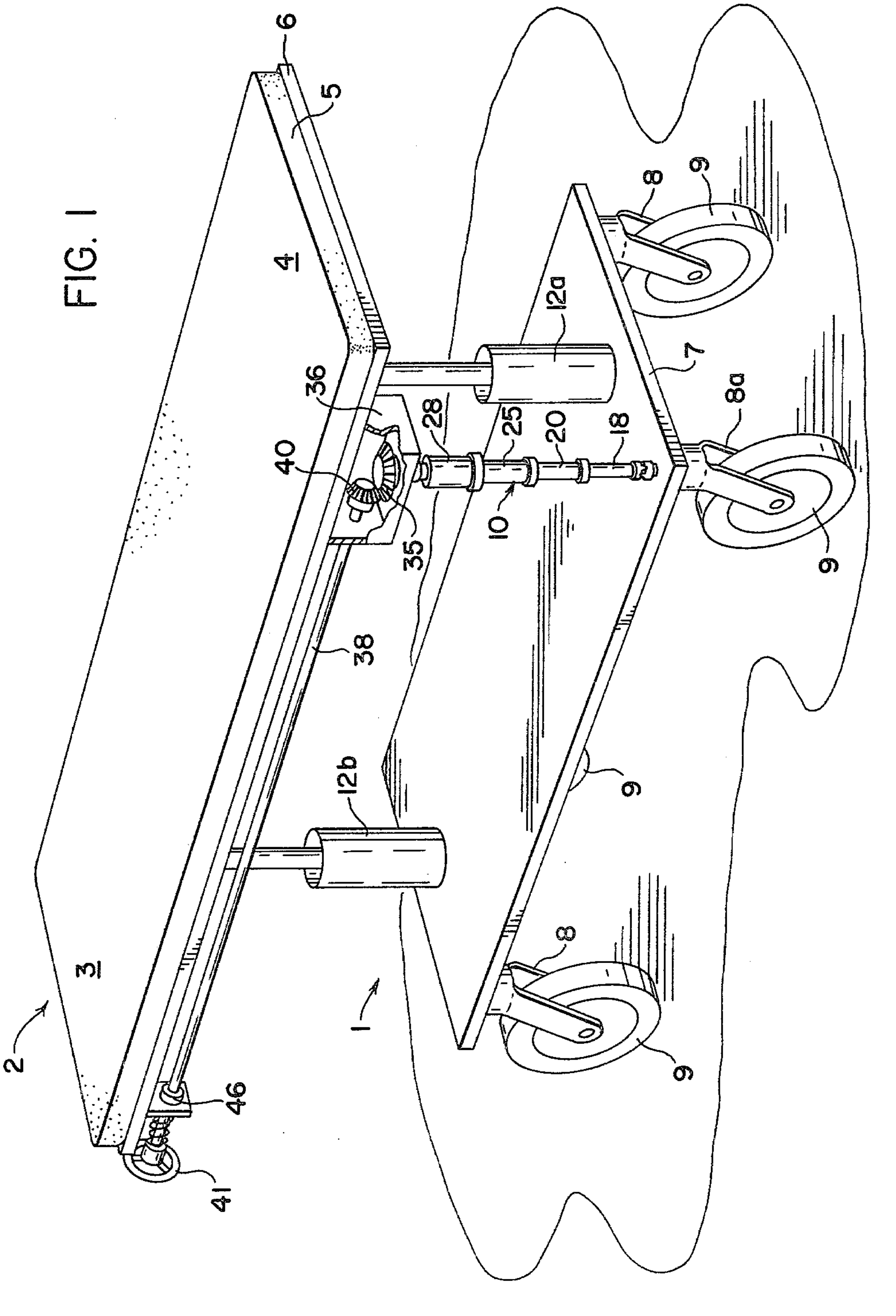
FIG. 1 is a perspective view of a stretcher embodying the invention with parts broken away to show gears of the steering mechanism.
Figure 2:
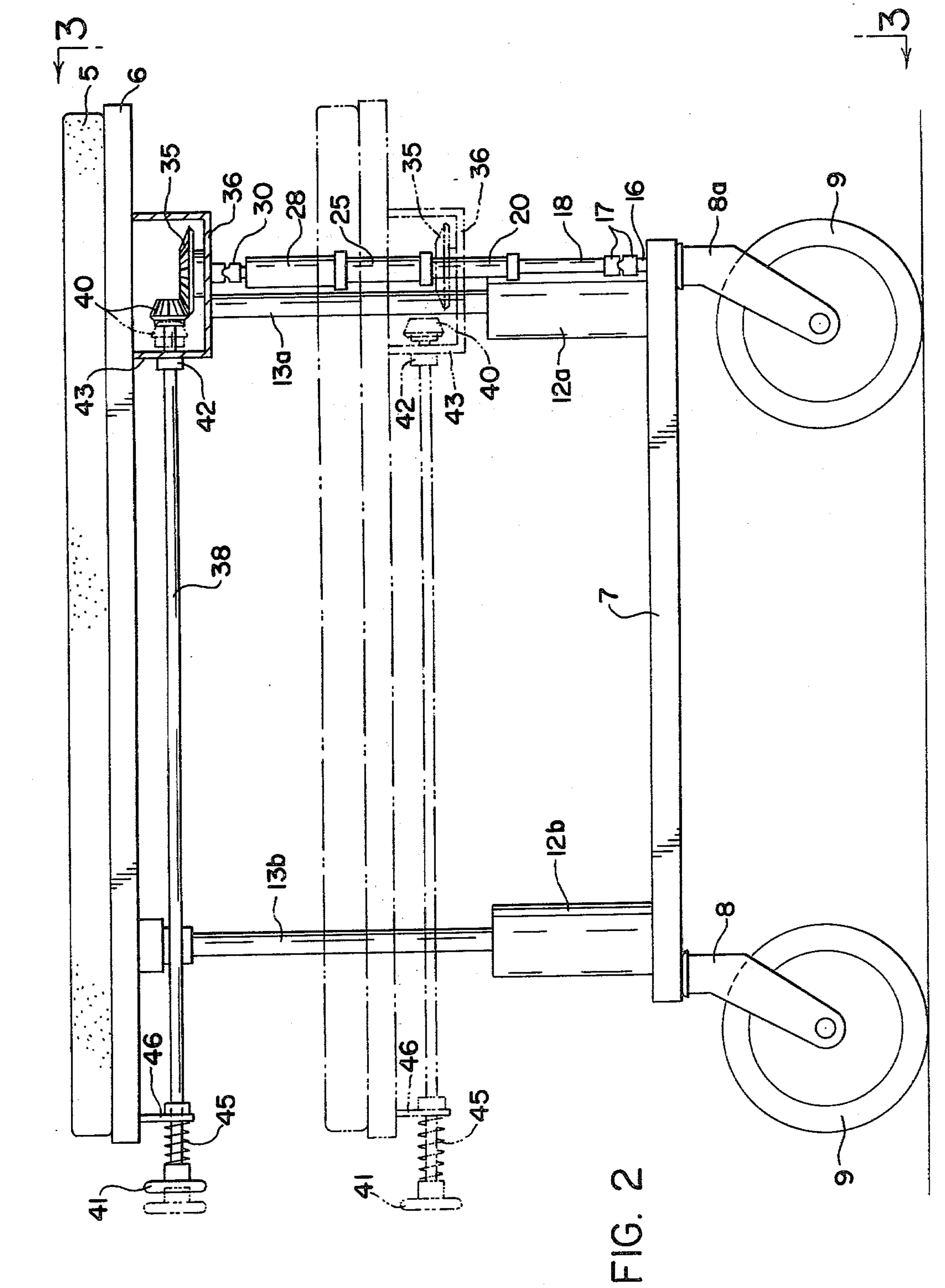
FIG. 2 is a side elevational view of the stretcher of FIG. 1 showing the bed portion in a raised position and in dotted lines the bed portion in a lowered position.
Figure 3:
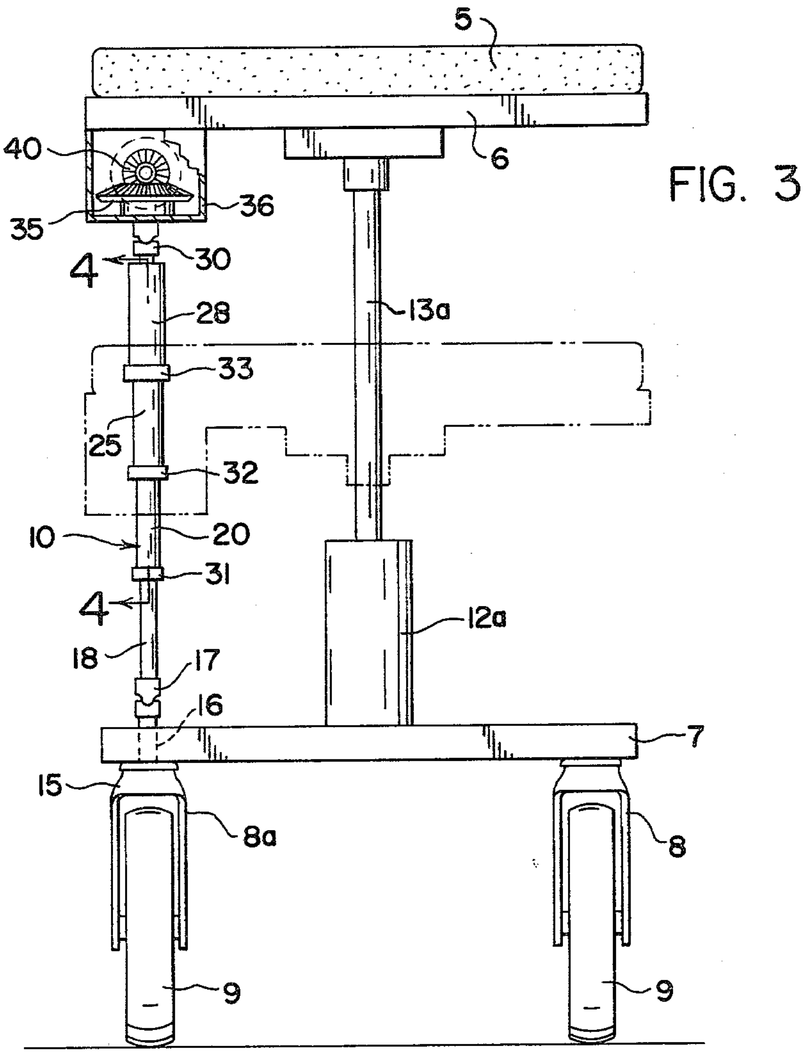
FIG. 3 is an end elevational view looking in the direction of the arrows 3—3 of FIG. 2.
Figure 4:
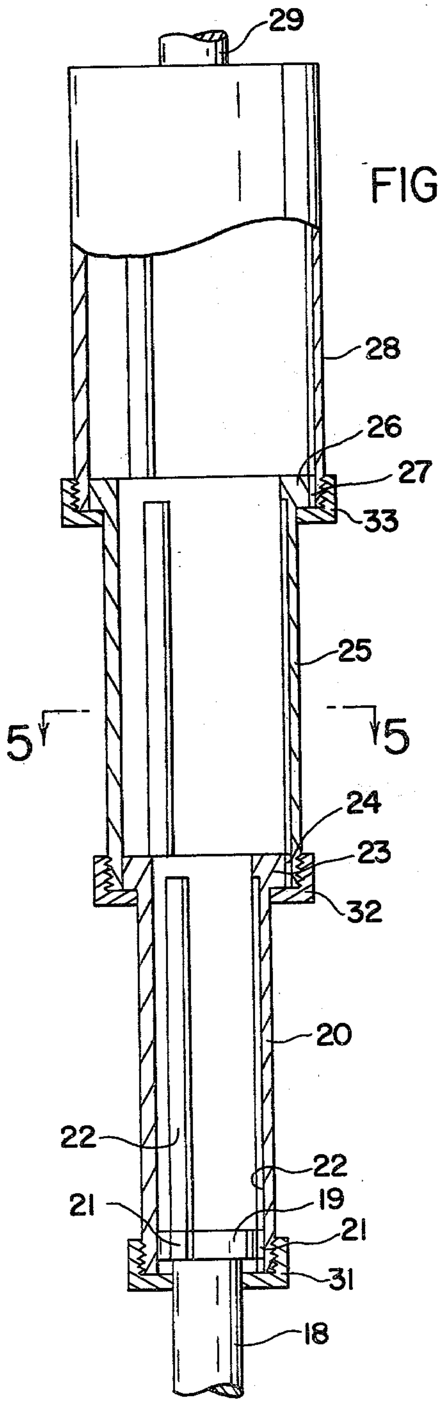
FIG. 4 is a sectional view on the line 4—4 of FIG. 3 through a portion of the telescoping guide linkage for one of the caster wheels.
Figure 5:
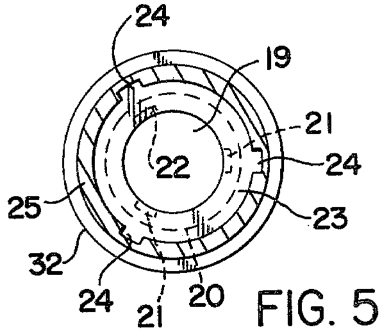
FIG. 5 is a sectional view on the line 5—5 of FIG. 4.

Referring more particularly to the drawings, the stretcher of the present invention comprise a chassis portion 1, and a patient-receiving bed portion 2. The bed portion has a head portion 3 and a foot portion 4 for respectively receiving the head and foot portions of the patient. The top portion 2 has a pad 5 of sponge rubber or the like overlying the flat table 6 of metal or suitable rigid material. The table and pad are of a suitable length and width to overlie the entire chassis 1.

The chassis 1 has a suitable rigid frame member 7 which may have any desired shape, even that of a flat sheet, and has a suitable width and length to provide stability to the stretcher. The frame 7 carries at each of the corner portions thereof a caster wheel assembly comprising a swivel frame 8 and a caster wheel 9 journaled therein. The swivel frames 8 and the wheels carried thereby are journaled to swivel or turn 360 degrees about an axis that is vertical and perpendicular to the frame 7 and to the floor on which the stretcher rides. The means for attaching the swivel frames 8 of all but one of the caster wheels may be conventional and is not shown. However, in accordance with this invention at least one and preferably only one of the swivel frames **8*a* is suitably connected through a guide, preferably a telescoping guide 10** through which that swivel frame may be turned to a desired direction by the operator of the stretcher.

Suitable means (not shown) may be provided for braking or preventing the rotation of the wheels 9 in the swivel frames 8. Conventional means, such for example as mechanical or hydraulic cylinders (not shown) in the respective cylinders **12*a* and 12*b*, for separately extending and/or retracting the respective pistons 13*a* and 13*b*** that support the foot and head portions of the bed portion of the stretcher in a conventional manner may be provided. One of the supporting pistons is connected to the frame and bed portion by conventional linkage (not shown) to permit tilting of the bed portion longitudinally as desired. In as much as the support of the bed portion on the chassis and the means for raising and lowering the head and foot portions is conventional and not part of the improvement of this invention, I have merely shown these in a schematic manner.

Now referring more particularly to FIGS. 2 and 3 to 5, and the means for selectively guiding the stretcher, which is the portion with which this invention is most particularly concerned, the upper portion of the swivel frame **8*a* is rigidly connected to the shaft 16. The shaft 16 is suitably journaled in the frame 7 to permit rotatable movement. The upper end portion of the shaft 16 is non-rotatably attached through the lower universal joint 17 to the lower or first section 18 of the telescoping guide 10. The section 18 has an upper enlarged portion 19 journaled to slide up and down only in a second portion or section 20 and has means such as the ears 21 which slide in grooves 22 of section 20, to prevent turning of section 18 with respect to section 20. Similarly section 20 has an enlarged portion 23 with ears 24 journaled to slide only longitudinally in third section 25. Similarly 3rd section 25 has means such as the enlarged portion 26 and ears 27 journaled in 4th section 28 to permit only longitudinal movement. The upper section 28 is rigid with stud 29 to which one end portion of the upper universal joint 30 is rigidly fastened. Suitable collars 31, 32, and 33 are threaded to the lower end portions of respective sections 20, 25, and 28 of the telescoping guide member to prevent the enlarged portions of sections 18, 20, and 25 from coming out of sections 20, 25, and 28** respectively.

The upper portion of the upper universal joint 30 is a shaft carrying miter gear 35 firmly attached thereto. The shaft portion of the universal joint 30 is suitably journaled to rotate in the lower portion of the frame of the gear box 36.

Mounted on the shaft 38 that extends about longitudinally or parallel to the bed portion is another miter gear 40 adapted to at least sometimes mesh with miter gear 35. The shaft 38 has firmly attached at one end thereof adjacent the head end of the bed portion a steering means, such as the steering wheel 41, and at the other end thereof the miter gear 40. The shaft 38 is preferably carried by the bed portion at the under side thereof and is suitably journaled to rotate and preferably to also slide longitudinally in the bearing 42 that is carried by the vertical side 43 of the gear box frame 36 which is carried by the table 6 of the bed portion 2 at the lower surface thereof. The bearing 42 and the side 43 of the gear box are preferably disposed a sufficient horizontal distance from the axis and teeth of the lower miter gear 35 to permit the gear 40 to be moved into and out of engagement with the lower miter gear 35 as shown by the solid and dotted positions respectfully. The bearing mounting flange 46 permits both longitudinal sliding and rotation of the shaft 38 therein. Spring means 45 that bears against the bearing mounting flange 46 and wheel 41 is preferably provided to normally hold the miter gears in a normally disengaged position so as to permit the free swivel movement of the wheels. However, with well lubricated or freely rotatable shaft 38, the resistance to swivel of the frame 8*a* is insignificant and substantially free swivel action results. There is thus provided, in accordance with my preferred embodiment of my invention, means permitting free swivel action of all wheels and means for optionally controlling the angle of swivel of a wheel at the foot end of the stretcher, which means is operable from the head end of the stretcher. Thus, when one needs to change direction, as for example turn a corner, one merely presses the steering wheel toward the foot end of the stretcher to engage the two miter gears and turn the steering wheel as desired. After turning, the wheel is turned back and the stretcher may be moved in any direction by free swivel action of all wheel assemblies as though no steering control was present.

Figure 6:
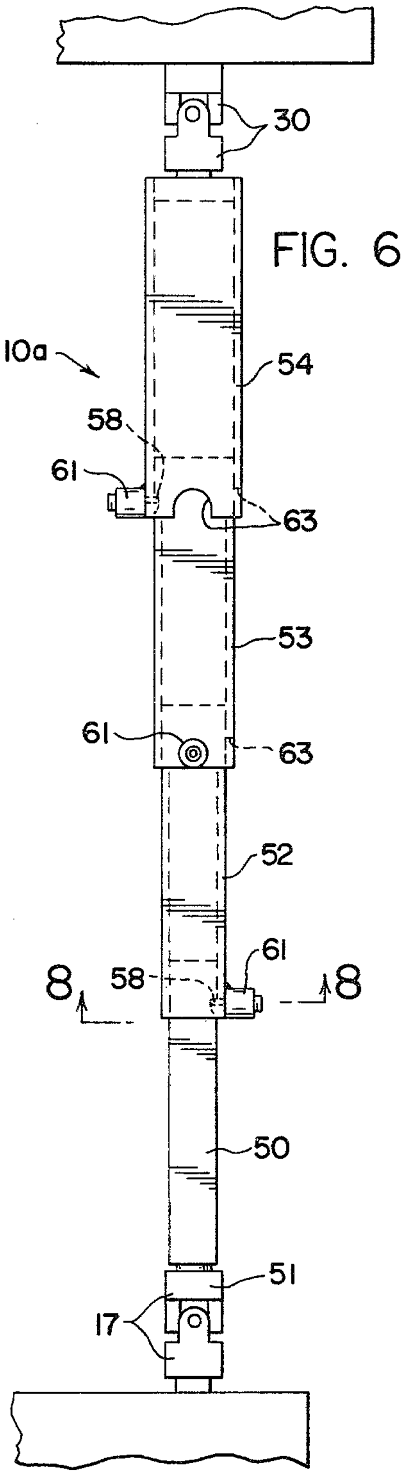
FIG. 6 is an elevational view in its extended position of a modified but preferred form of telescoping guide linkage for directing the angle of swivel of one of the caster wheels.
Figure 7:
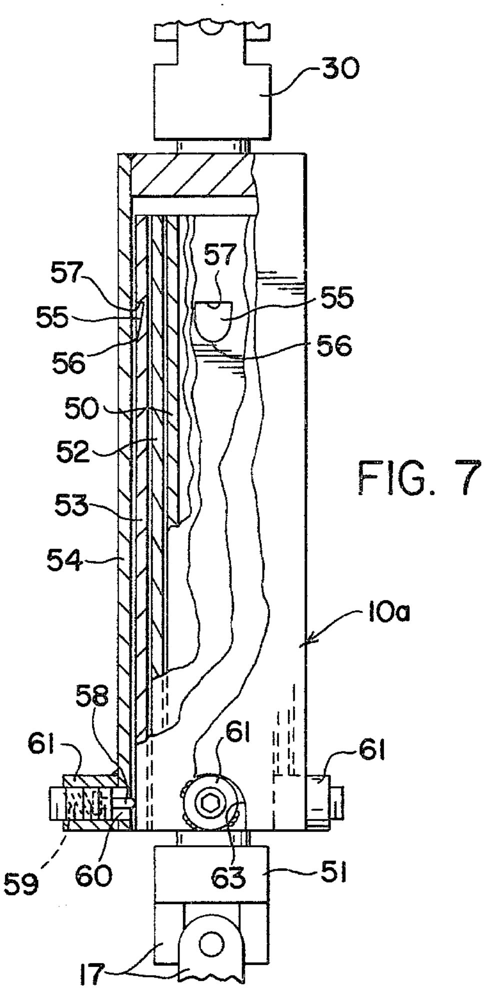
FIG. 7 is an elevational view partly in section and with portions broken away of the guide linkage of FIG. 6 in the compressed or retracted position.
Figure 8:
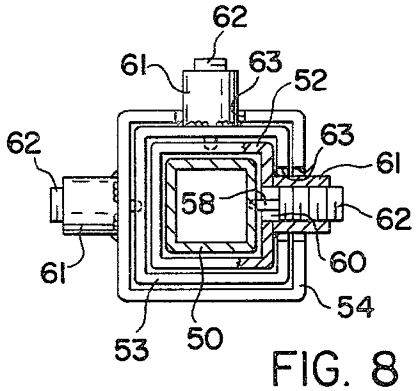
FIG. 8 is a view partly in section looking in the direction of the arrows 8—8 of FIG. 7.

Now, while the telescoping guide member shown in FIGS. 1 through 5 is satisfactory for most uses, the thickness of the enlarged portions and the retaining caps prevents sufficient retraction of the telescoping guide for the extreme lowering of the bed portion that is sometimes desired. In FIGS. 6, 7, and 8, I have shown my preferred form of telescoping guide member which permits a substantially greater retraction or collapse of the member from its extended position because no enlarged portions or collars are required.

Referring more particularly to FIGS. 6, 7, and 8, the telescoping guide member 10*a*, which is preferably used in place of that shown in FIGS. 1 to 5 inclusive, comprises a plurality of tubular sections of different cross sectional size but of similar cross sectional shape. Each successive section is larger than the preceeding section and is shaped to permit longitudinal sliding movement only of the preceeding section therein. As shown the sections are of square cross-sectional shape, preferably the sections are of polygonal shape, the polygon having as many sides as there are sliding sections in the telescoping guide. All sections, save for the smallest, are necessarily tubular so that the next smaller section can slide longitudinally but not turn therein. The smallest section 50, which may or may not be tubular, is rigidly attached to the upper portion 51 of the lower universal joint 17. The next larger 2nd section 52 has just sufficiently larger internal dimensions to permit the first section 50 to slide freely therein. Similarly the 3rd and 4th sections 53 and 54 respectively have inner dimensions just sufficiently larger than the outer dimensions of the next smaller section to permit it to slide freely therein. The length of each section is preferably substantially the same.

Latch means is provided between successive sections to prevent successive sections from separating when the guide is extended the maximum amount and to permit telescoping collapse or retraction of the guide member when it is desired. The latch means comprises a spring loaded protrudable member at an end portion of one section and a cavity or stop in the opposite end portion of a mating member (usually the next smaller section), The protrudable member and the cavity or stop are disposed on contacting faces so that when the guide is extended the protrudable member will enter the cavity and bear against the stop. A tapered surface so disposed as to cause said protrudable member to move against spring pressure when said sections are pushed from maximum extended position toward a collapsed condition of the guide, permits relative movement of the sections in one direction only when said protrudable member is extended into the cavity.

As shown in FIGS. 6 to 8 inclusive, the latch means comprises a cavity or slot 55 on an upper end portion of each of the sections 50, 52, and 53. The slots are on an outer face of said sections which slide into sections 52, 53, and 54 respectively and a spring loaded protrudable latch pin 58 which is carried by the lower overlapping end portions of respective sections 52, 53, and 54 is so disposed to cooperate with said slots. The latch pin of each overlapping section is aligned with the cavity of the next underlying section. The cavity and the latch pin on each section are preferably on different faces of the polygon and the cavities and latch pins of the different sections are disposed in different vertical planes through the center of the guide.

The slot or cavity 55 of the latch means has a wedge shaped longitudinal section and is tapered in depth from zero at the juncture 56 of its bottom surface with the outer surface of the section to a maximum depth at a stop or transverse wall 57 which is preferably about perpendicular to the surface of the section.

The latch pin 58 slides horizontally in a bearin 60 carried by each over-lapping section at a lower portion thereof in one of the tubular bosses 61. The latch pin 58 is biased or forced towards the interior of the sliding section carrying it by the spring 59 retained in each boss 61. Means such as the adjusting stud 62 threaded into each boss 61 is provided for adjusting the tension or force exerted on the pin 58. The latch pin 58 and the cavity of the next smaller section of the telescoping guide are aligned longitudinally so that the pin 58 will enter the cavity. In the intermediate sections 52 and 53 which carry both a cavity and a latch pin at opposite end portions, the cavity and and latch pin are in different longitudinal or vertical planes i.e. are angularly displaced and when the sections are polygonal in cross section are on different faces of the section. All of the latch pins and their cooperating cavities are angularly displaced i.e. are in different vertical planes through the center of the guide member 10, the universal joints 17 and 30, and the swivel shaft 16 of the swivel frame 8*a*. To permit maximum collapse or retraction of the telescoping guide member 10 from its extended position each face of the overlapping sections that would bear against a boss 61 of a lower section has a portion of that face removed forming a notch 63 to permit the section to completely overlie the lower section. Thus, in a four section guide, having sections 50, 53, 52, and 54 as shown, The 3rd section 53 has a U-shaped notch 63 in the lower end of one wall thereof to permit entry therein of the boss 61 carried by section 52, and section 54 has a U-shaped notch in each of two walls thereof to permit entry of of the boss 61 carried by section 53 and the boss 61 carried by section 54 respectively, when the guide 10 is in its most retracted position. It is thus seen that with the latching arrangement and the angular disposal of latches in the different sections the retracted length of the telescoping guide member may be about the length of each section. The outermost section 54 is fixedly attached to the lower portion of the upper universal joint 30 and through it to the lower miter gear 35.

The stretcher of my invention has full freedom of movement in any direction had by a stretcher having no steering connection to any caster wheel, yet it has the ability to be steered in the same manner as a vehicle with steering permanently attached to both front wheels in the normal manner. This enables one man to transport patients instead of the two men required with ordinary stretchers of which I am aware.

It is recognized that various modifications of the device shown in the drawings may be made without departing from my invention. It is my intention that my invention be limited only by the appended claims.

I claim:

1. In a stretcher for transporting hospital patients and the like from place to place, which stretcher has a patient-receiving bed portion and a chassis portion supporting said bed portion and means for raising and lowering said bed portion with respect to said chassis portion, said chassis portion having a frame and and caster-wheel assemblies at each corner portion of said frame, all of said caster-wheel assemblies having a swivel frame in which the wheel is rotatably carried and being freely swivelable about a vertical axis when so desired, the improvement which comprises steering means for optionally and selectively turning the vertical plane of one wheel, said steering means being operable from the end of the stretcher opposite that carrying said wheel and including a telescopically extendable and retractable guide member having one end thereof suitably attached to a swivel frame of one wheel, said guide member having a plurality of rigid generally tubular sections of progressively larger cross-sectional dimensions, each of said sections save the largest being only longitudinally slidable into the next larger section, and means for preventing separation of said sections of said telescoping guide member when said guide member is extended to its maximum length, and means operable from a remote portion of the stretcher for turning the upper end of said guide member and through it the angular position of the plane of one wheel.

2. The stretcher of claim 1 wherein the said telescopically extendable guide member has sections of polygonal cross-sectional shape successive sections having internal cross-sectional dimensions to accept the outer surface of a preceeding section and permit longitudinal sliding therein, and latch means between successive sections to prevent separation of sections when said guide member is extended to maximum length but permitting the shortening of the telescoping guide member.

3. The stretcher of claim 2 wherein said latch means comprises a cavity in the upper end portion of an outer wall of each section of the telescoping guide member that is within an other section thereof, a spring loaded latch pin carried by a lower portion of the corresponding wall of the next overlying section, and an inclined surface disposed so as to compress the said latch pin against the the spring thereof when the sections are moved towards a retracted position of the telescoping member.

4. The stretcher according to claim 3 wherein one of said latch pins and biasing spring therefore is carried in a boss at a lower end portion of each section that overlaps another section, said latch pin being in the same vertical plane as the cavity in the next underlying section, the bosses in successive sections being disposed in different vertical planes through the center of the guide member, each of said sections that overlie a section carrying one of said bosses having suitable notches in the lower end of the wall thereof to permit entry therein of bosses carried by underlying sections, whereby said telescoping guide member may be retracted to a length about equal to the length of one of the sections thereof.

5. The stretcher according to claim 1, wherein the upper end portion of said telescoping guide member is attached through a universal joint to a first miter gear that is rotatable about an axis that is about perpendicular to the said bed portion and in a bearing that is carried by said bed portion, a substantially horizontal steering shaft also carried by said bed portion at the underside thereof, said steering shaft extending from an end portion of the stretcher opposite from that carrying the said first miter gear to said miter gear and being rotatably carried in bearing and having at one end fixed thereto a second miter gear and at the other end thereof a steering handle to facilitate turning of said shaft by an operator of said stretcher, said shaft and said 2nd miter gear being turnable as a unit and said miter gears being adapted to mesh together.

6. The stretcher of claim 5 wherein said steering shaft and said second miter gear are both horizontally slidable and rotatable to cause said miter gears to mesh together or to separate as desired, and spring means is had to normally hold said miter gears in an unmeshed condition.

* * * * *